D. B. SHELLER.
AUTO BURGLAR ALARM.
APPLICATION FILED OCT. 9, 1920.

1,418,177.

Patented May 30, 1922.

David B Sheller INVENTOR

UNITED STATES PATENT OFFICE.

DAVID B. SHELLER, OF TACOMA, WASHINGTON.

AUTO BURGLAR ALARM.

1,418,177.  Specification of Letters Patent.  Patented May 30, 1922.

Application filed October 9, 1920. Serial No. 415,842.

*To all whom it may concern:*

Be it known that I, DAVID B. SHELLER, a citizen of the United States, residing at the city of Tacoma, in the county of Pierce and State of Washington, have invented a new and useful Auto Burglar Alarm, of which the following is a specification.

My invention relates to improvements in devices designed for sounding an alarm when an automobile or other motor driven vehicle is operated by a thief or other unauthorized person; and the objects of my invention are, first, to provide and conceal a burglar alarm within the brake drum of an automobile or other motor driven vehicle; and second, to provide a concealed device to be set by the owner on leaving his automobile, and said device to sound an alarm when said automobile or truck is set in motion by any unauthorized person.

I attain these objects by means of the device illustrated in the accompanying drawing in which—

Figure 1:
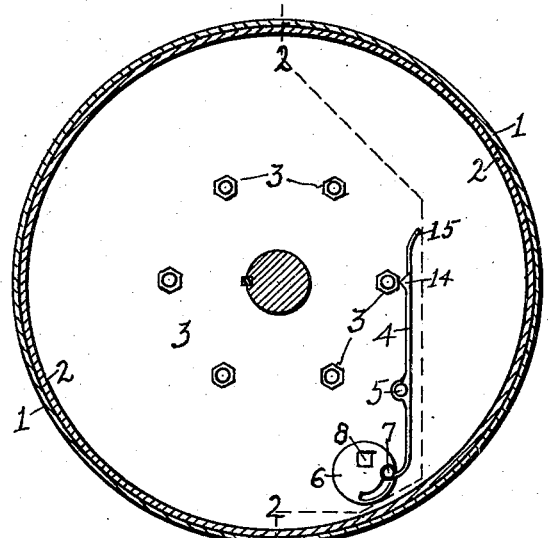
Figure 2:
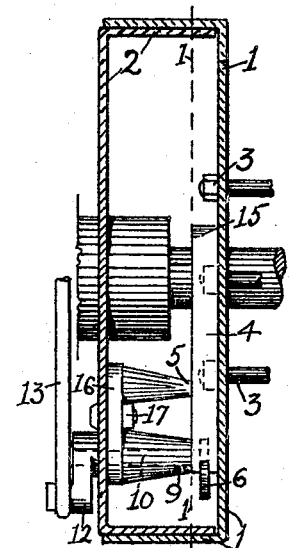
Figure 3:
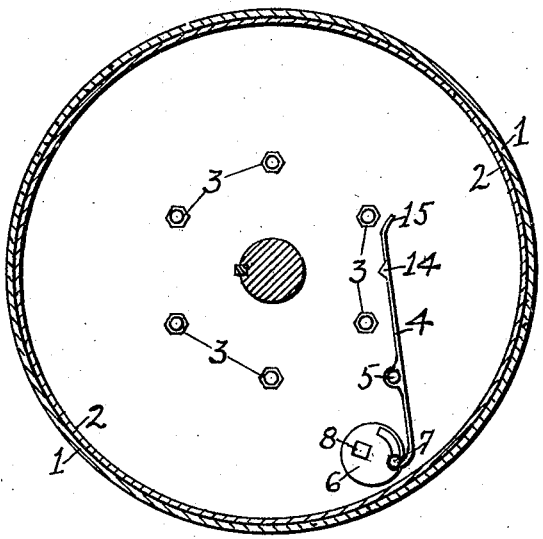
Figure 4:
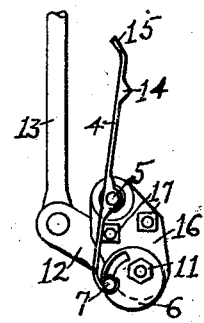

Figure 1 is a section of the brake drum of an automobile on line 1—1, Figure 2 and with a view to the right, and shows the device set in an inoperative position, and Fig. 2, is section of Fig. 1 on line 2—2 looking to the right and showing a face view of my device. Figure 3 is the same as Fig. 1, and shows the device set in an operative position, and Figure 4 is a left side view of the device as it appears complete when detached from the brake drum.

Similar numerals refer to similar parts in the several views.

The brake drum of a motor driven vehicle usually consists of a shallow open-faced drum bolted to the driving wheel, and made to, either fit inside or outside of a similar open-faced drum fixed on the housing axle in which the driving axle revolves. My invention is represented attached within a brake drum 1 which is fitted to revolve outside the housing axle drum 2. The drums vary in dimension on different machines, and my invention is designed to vary in size to be suitably installed.

The brake drum 1 is fixed to the side of the driving wheel for instance, to its hub or spokes (not shown) by means of bolts 3, and will revolve with the wheel. The inner drum 2 will be fixed to the usual housing of the axle and will be stationary.

My invention comprises a device mounted on the inner face of drum 2 and having a spring actuated contact with the bolt head 3. This will make a sharp clacking noise when used by an unauthorized person, that will attract attention and lead to the arrest of the offender.

The device consists of a stout spring steel bar 4 pivotally mounted on a stud at 5. One end of the spring steel bar 4 is formed or slotted to receive a disk cam 6 which is connected with the spring bar by a pin 7 passing through a slot formed in the cam. The cam is mounted at 8 at the end of a stud 9 by means of a crank shaft 10 passing through stud 9 and provided with a securing nut 11. The shaft 10 has at its other end a crank 12 which is operated by a rod 13 which will be extended to a suitable place in the vehicle where the owner only will have knowledge and control of it. By this means the owner on parking or leaving his car can set the alarm by operating the cam 6 to shift the spring bar 4 from the position shown in Fig. 1 to the position shown in Fig. 3. It will be observed that the spring bar 4 has a V-shaped projection 14. This V-shaped projection 14 will clear the bolt nuts 3 when the spring bar 4 is set as shown in Fig. 1, but when set as shown in Fig. 3 the spring bar 4 and V-shaped projection 14 will contact with the bolt nuts 3 as the driving wheel turns and will make a clacking, rattling noise or alarm that will give notice that an unauthorized person is driving the machine. It will be observed that the spring bar 4 is outwardly bent at its free end 15 in order to cause it to ride over the bolt nuts 3, should the machine at any time be run backward.

The entire mechanism of the device is mounted on the two studs or posts 5 and 9. These studs 5 and 9 are cast on a common base 16 which is suitably located on the inner face of drum 2 and fixed in place by the two bolts 17, the holes for same being drilled through the face of drum 2.

My invention can be attached to the housing axle drum by removing the driving wheel, locating and drilling the holes for bolts 17 and bolting the base 16 with studs 5 and 9 thereon in place. The spring bar 4 with operating cam 6 are then fitted to their respective studs, the crank shaft 10 inserted and the nut 11 screwed on. The means for operating crank 12 through rod 13 is then completed, the driving wheel replaced and my newly invented device is then ready for service.

It is to be observed that I do not limit myself to any exact details or proportions, but reserve the right to vary the same to meet conditions and dimensions required by different makes of automobiles and motor vehicles.

Having described my invention, I claim:

1. An auto-theft alarm, comprising in combination with a vehicle brake-drum; a spring-bar pivotally mounted within the brake-drum, a rotatable cam mounted within the drum and formed with an arcuate slot, means connecting one end of the pivoted spring bar with the slotted portion of the cam for positively throwing the other end of bar into and out of alarm-giving position, and means for rotating the cam to throw the pivoted bar into and out of the path of studs attached to a rotating portion of the brake-drum to make and break contact with the studs.

2. An auto-theft alarm, comprising in combination with a vehicle brake-drum having one member of the drum provided with bolts for attachment to the vehicle wheel to rotate therewith; a spring-bar pivotally mounted within the drum in position to have one end shifted into and out of the path of the attachment bolts, a rotatable cam mounted within the drum and having one end of the spring bar positively connected thereto for shifting the bar to bring it into and out of the path of the attachment bolts, and means for rotating the cam.

3. An auto-theft alarm attachment for a vehicle brake-drum, said attachment comprising a base member for attachment to a part of the brake-drum, a pivoted spring bar and a rotatable cam supported from the base member, means pivotally connecting one end of the spring bar with the cam, and a shaft connected with the cam for rotating it to throw the spring bar into and out of alarm-giving position.

DAVID B. SHELLER.